United States Patent [19]

Menzi

[11] 4,452,286
[45] Jun. 5, 1984

[54] APPARATUS FOR CUTTING TREE PARTS

[75] Inventor: Ernst Menzi, Widnau, Switzerland

[73] Assignee: Ernst Menzi AG, Widnau, Switzerland

[21] Appl. No.: 347,561

[22] Filed: Feb. 10, 1982

[30] Foreign Application Priority Data

Feb. 19, 1981 [CH] Switzerland .................... 1097/81

[51] Int. Cl.³ .................................. A01G 23/02
[52] U.S. Cl. .................................. 144/34 E; 83/607; 144/3 D; 144/339
[58] Field of Search ............... 144/3 D, 34 R, 34 E, 144/339; 83/601, 607

[56] References Cited

U.S. PATENT DOCUMENTS

| 3,270,787 | 9/1966 | Rehnstrom | 144/34 E |
| 3,279,295 | 10/1966 | Teplitz | 83/607 |
| 3,482,614 | 12/1969 | Jordan et al. | 144/34 E |
| 3,506,043 | 4/1970 | Fulghum, Jr. | 144/34 E |
| 3,550,655 | 12/1970 | Murphy | 144/34 E |
| 3,667,515 | 6/1972 | Corey | 144/34 E |
| 4,046,179 | 9/1977 | Crawford | 144/34 E |
| 4,364,292 | 12/1982 | Wozniak et al. | 83/607 |

Primary Examiner—W. D. Bray
Attorney, Agent, or Firm—Toren, McGeady and Stanger

[57] ABSTRACT

Apparatus for cutting tree parts adapted to be operatively mounted on vehicles including a base structure configured to define a concave cutting recess for receiving therein the tree part to be cut with at least one pivotable holding arm adapted to grip a tree part engaged within the cutting recess and with a cutter plate having a generally planar configuration and defining a cutting edge adapted to be moved through the cutting recess to cut the tree part held therein. The cutter plate is pivotally mounted on the base structure for movement through a cutting operation by pivotal motion thereof and a slotted guide opening is defined in the base structure between the cutter plate pivot and the cutting recess through which the cutter plate moves during a cutting operation. The cutter plate thereby is capable of projecting freely through the slotted guide opening into the cutting recess over the sector of the cutter plate adjacent the cutting edge thereof by passage of the cutting edge through the cutting recess.

9 Claims, 5 Drawing Figures

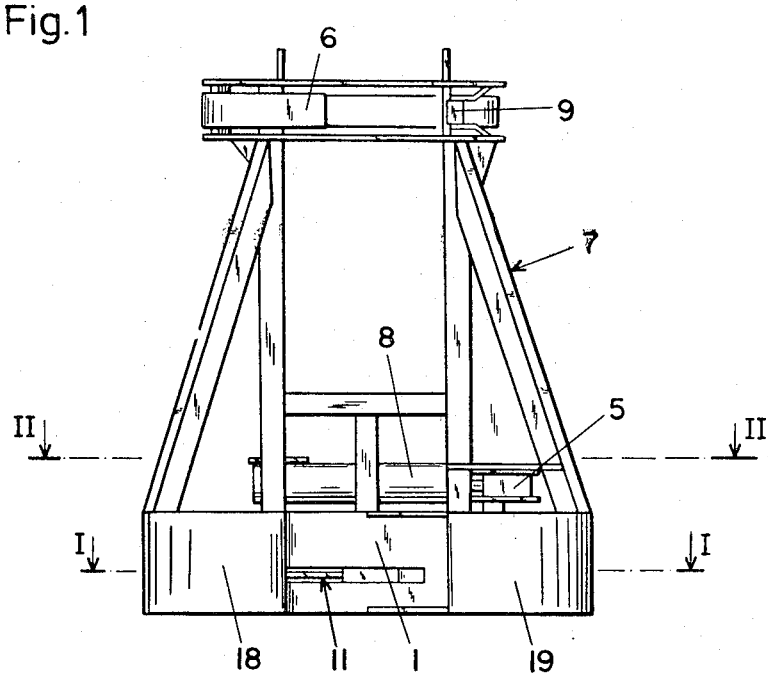
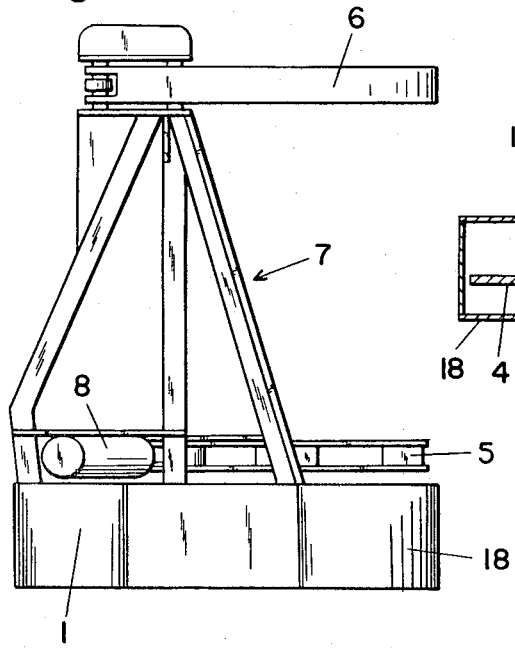
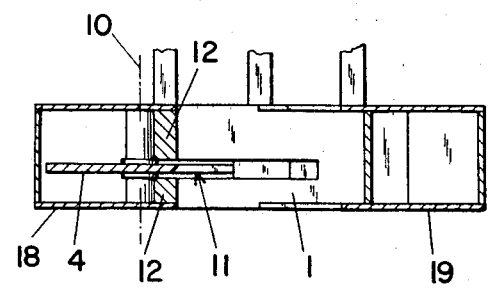

APPARATUS FOR CUTTING TREE PARTS

The present invention relates generally to a device for cutting parts of trees such as limbs and trunks and more particularly to a device which may be attached to vehicles such as an excavator. The invention relates to an apparatus of the type which may be composed of a base structure defining a cutting recess or opening for receiving therein the tree trunks or limbs to be cut. In such apparatus, at least one pivotable holding arm is provided for gripping the tree part and a cutter member constructed as a plate-like steel part is pivotably held with the cutter blade and the holding arm or arms and, if necessary, the base structure, being movable by drive means such as hydraulic, pneumatic, and/or mechanical drive mechanisms.

Devices for cutting tree parts are known in the prior art wherein cutters are held pivotably for movemnt about an axis. In one known device, the cutters are held at one end thereof in a bearing from which they freely project. In working with such devices, it has been found that the cutters do not always move through the tree part exactly on a predetermined plane and instead become deflected through relatively substantial distances upwardly or downwardly. Due to this deflection, the cutter member thus avoids the especially hard sectors of the tree part or trunk so that substantial stresses are caused to act upon the cutter itself and also upon the bearing mechanism.

In cutters of this type which are merely suspended in a bearing bolt, mechanical deformations will result after only short periods of operation thereby rendering the device no longer serviceable. Additionally, particular disadvantages arise when two cutters are provided which are movable against each other. Where such cutters are provided, it is possible that during a cutting stroke, the cutters will follow different paths through the tree part and thereby meet each other in a central area with a corresponding spacing or distance therebetween. If the two cutter blades do not come together at the end of the cutting stroke, there will result an incomplete cutting operation and the uncut parts of the tree limb or trunk must then be severed by other means.

Additionally, if the cutting edges of the cutters deviate from a predetermined path of movement, when they impact against each other there will arise the danger of severe damage to the cutters.

In known designs, provision is made for reinforcement of the cutters by suitably located supporting profiles or sections. However, as a result of this, the cutting range may be substantially limited on the one hand, since the cutting stroke may be performed only across the breadth of the cutter that will maintain the proper reinforcement, while on the other hand when cutter deformations occur, there will result at the same time the deformation of the reinforcing parts so that later adjustment is difficult or impossible to perform. It has been found, especially when hard woods are to be processed, that even the strongest reinforcement of the cutters can tend to become distorted.

In another known design involving shears for cutting trees, a cutter is held in a bearing and the area of the cutter which immediately surrounds the bearing engages between two supporting plates. The cutter, in its retracted position as well as after a completed cutting operation, projects freely and in the process, a hydraulic cylinder engages the free end of the cutter. On the one hand, the freely projecting area of the cutter is relatively inflexible because of the arrangement of the hydraulic cylinder in this area, while at the same time it is, of course, precisely in this free end area of the cutter that a particular depth of the cutter must be provided especially since a bearing mechanism must be provided for the hydraulic cylinder. If, during the course of several cutting operations, the cutter becomes somewhat deformed, there is little possibility of correcting such deformation. Thus, this deformation will tend to lead to difficulties in the actuation by the hydraulic cylinder since in each cutting operation after an initial deformation, the tendency to deform will increase.

The present invention is directed toward provision of cutting apparatus wherein there is provided an arrangement for avoiding the disadvantages mentioned above whereby it is possible for the cutter during the range of its movement to follow a free course through the cutting range while nevertheless avoiding excessive stresses on the cutter bearing device.

SUMMARY OF THE INVENTION

Briefly, the present invention may be described as apparatus for cutting tree parts adapted to be operatively mounted on vehicles comprising a base structure configured to define a concave cutting recess for receiving therein a tree part to be cut, at least one pivotable holding arm adapted to grip the tree part engaged within the cutting recess, a cutter plate having a generally planar configuration and defining a cutting edge adapted to be moved through the cutting recess to cut the tree part held therein, pivot means pivotally mounting the cutter plate on the base structure, means for driving the cutter plate through a cutting operation by pivot motion thereof about the pivot means, and means located between the pivot means and the cutting recess defining a slotted guide opening adjacent the cutting recess through which the cutter plate moves during a cutting operation, the cutter plate thereby projecting freely through the slotted guide opening into the cutting recess over the sector thereof adjacent the cutting edge as the cutting edge passes through the cutting recess.

Thus, in accordance with the invention, the cutter is held at least over a portion of the region of the base structure lying between the axis of rotation of the cutter and the cutting recess within a slotted guide opening which extends at least approximately across a certain section of the part of the base structure adjoining the receiving opening, i.e., that section of the base structure which is traversed by the cutting edge of the cutter. Thus, the section of the cutter which in the cutting process is swung out into the receiving opening will project freely into the receiving opening.

As a result of the measures provided in accordance with the present invention, the cutter is once more held or guided between the region wherein the cutting process occurs and the axis of rotation of the cutter. Thus, stresses which arise need not be absorbed entirely by the bearing bolts which form the pivot means or axis of rotation. As a result, there is provided the capability of forming a freely projecting section of the cutter so that the cutter can traverse a path of least resistance across the tree trunk. Through the choice of a suitable steel for the cutter, the cutter may undergo slight deformation in the cutting process without difficulty since after a cutting operation has been performed the cutter will be guided backwardly into its rest position through support means which will tend to restrain the cutter for movement through a plane defined by the slotted guide opening. Thus, the cutter in its retracted rest position lies, at least in the region adjacent the cutting edge thereof, within a slotted guide opening and is thereby supported on the one hand against other mechanical influences and on the other hand is constantly aligned in a planar orientation so that with each new cutting operation, the same prerequisites will apply.

It has been found in cutting tests that, given a cutter with a working range of about 40 cm, the free end of the cutter will deviate about 2 to 4 cm from a theoretical cutting plane. Due to the special guide means for the cutter, this deviation will present no problems.

It has also been found that by means of the special type of guide structure for the cutter in accordance with the present invention and by means of the freely projecting arrangement of the invention, fracture of the cutter during a cutting process is practially eliminated and, moreover, damage to the cutting edge is unlikely to occur especially since the free end of the cutter need not engage into any guide device at the opposite end of the base structure and it can therefore readily move within a corresponding lateral range.

Tests have shown that by means of the special measures provided, the power requirement for the cutter can be reduced and hard woods of up to 40 cm in diameter may be readily severed with a clean cut utilizing relatively small hydraulic cylinders as the drive means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 1 is a schematic front view of a device in accordance with the present invention;

FIG. 2 is a side view of the device shown in FIG. 1;

FIG. 5 is a sectional view along the line III—III in FIG. 4.

DETAILED DESCRIPTION OF THE PREFERRED EMBODIMENT

Figure 4:
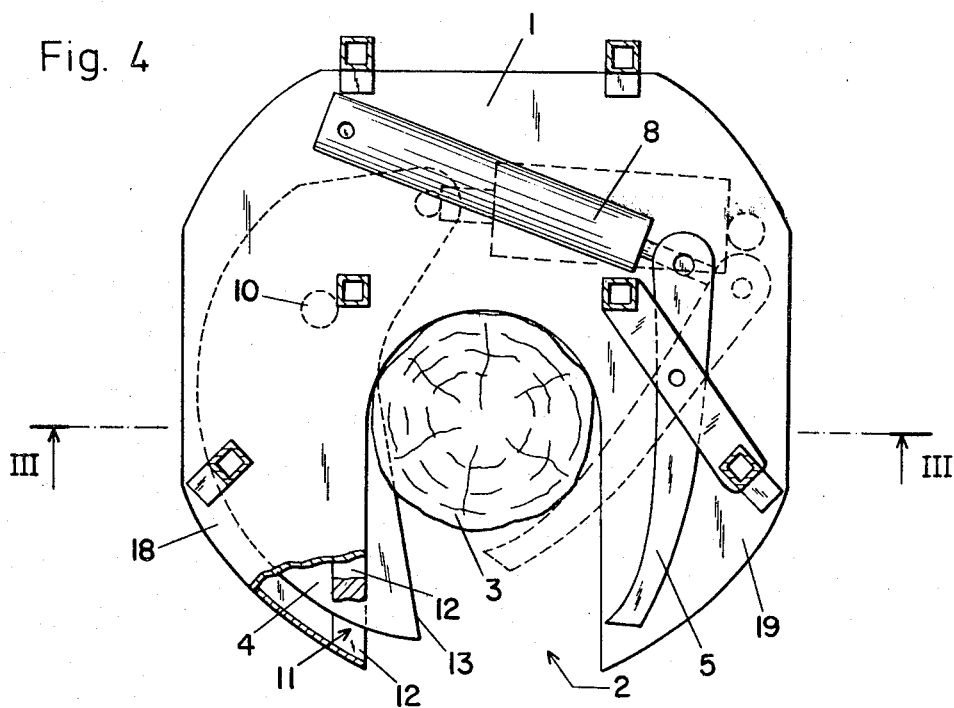
FIG. 4 is a sectional view taken along the line II—II in FIG. 1.

Referring now to the drawings, the device of the present invention is shown as composed essentially of a base structure 1 which is configured to define an approximately U-shaped concave receiving opening 2 which forms a cutting recess for a tree trunk or part 3 which may be engaged therein. A pivotable cutter plate 4 is pivotally mounted on the base structure 1 and holding arms 5 and 6 are also pivotally mounted on the base 1, with the arms 5 and 6 operating to grip a tree or part engaged within the recess 2 during a cutting operation.

The device of the present invention is of the type which is particularly suited for attachment to vehicles and the movement of the individual holding arms 5 and 6 as well as of the cutter plate 4 may be suitably performed to effect the intended purpose by drive means which may include hydraulic cylinders. Advantageously, apparatus of the type described may be mounted on the boom arm of an excavator or other similar vehicle and the mounting elements related to this type of mounting arrangement have been omitted from the drawings for the sake of clarity. Such an arrangement mounting the cutter device on a boom arm would make it possible to pivot and rotate the base structure 1 together with a corresponding superstructure 7 thereof in order thereby to achieve proper positioning and adjustability of the apparatus relative to the tree part to be cut. Additionally, mounting of the device on a vehicle makes it possible for a severed tree trunk or part which is held fixed by the holding arms 5 and 6 within the recess 2 to be lifted and set down at a desired location. It is also possible with a device such as that of the present invention to grasp a bundle of a plurality of thinner tree trunks or parts and to transport them to another location. The holding arms 5 and 6 may be driven by means of hydraulic cylinders 8 with a stationary arm 9 being located opposite the holding arm 6 as a counterholding member.

Figure 3:
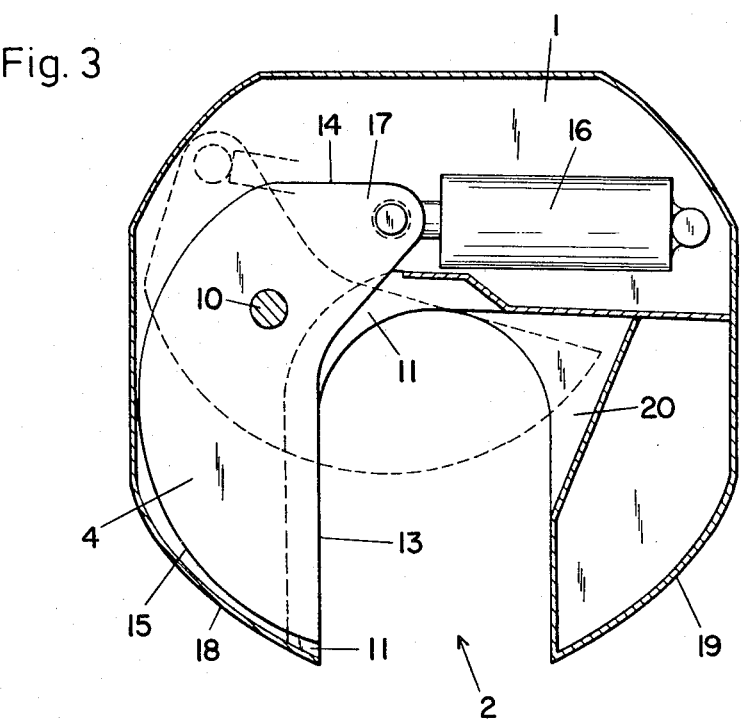
FIG. 3 is a sectional view taken along the line I—I FIG. 1.

The cutter 4 is constructed in the form of a steel plate which is pivotable about an approximately vertical axis 10. Over at least a portion of the region of the base structure 1 lying between the axis of rotation 10 of the cutter plate 4 and the receiving opening or recess 2, there is provided a slotted guide opening 11 within which the cutter plate 4 is held during its turning action through a cutting stroke. That section of the cutter 4, seen in dash line position in FIG. 3, which is swung out into the receiving opening 2 during the cutting process will project freely into the receiving opening 2 and can thus perform suitable movements. Thus, the cutter member 4, in the area between the axis of rotation and the freely projecting part which effects the cutting operation is further held in a guide mechanism so that the mechanical stress on the bearing device for the cutter 4 which forms the axis of rotation 10 may be substantially reduced.

Moreover, because of this support structure, it is not necessary to provide corresponding reinforcement profiles so that, on the one hand, there is no restriction in effecting cutting through of the tree parts since the cutter, over its entire breadth, may make its way through the tree part and, on the other hand, the freely projecting part of the cutter may accordingly be flexibly movable so as to seek the path of least resistance through the tree part to be cut.

The slotted guide opening 11 may be shaped, for example, of profiled parts 12 which may be of a welded construction and this guide structure extends across a certain section of the border of the base structure 1 adjoining the cutting recess 2, i.e., that of the base structure which is traversed by a cutting edge 3 of the cutter plate 4.

The border of the slotted guide opening 11 which faces the cutting recess 2 defined in the base structure 1 is aligned to be flush with the cutting edge 13 of the cutter plate 4 when the cutter plate 4 is in the retracted position. Thus, on the one hand, there is provided a corresponding shield for the cutting edge 13 and, on the other hand, there is also provided a mechanism whereby the cutter plate 4 may be straightened during a retraction movement into the rest position if it has become bent out of shape during a cutting operation.

The covering of the cutting edge 13 by means of the guide mechanism is also of particular advantage when the apparatus is arranged on an excavator with the power turned off, in which case continued movement must be by use of the excavator mechanism or with the help of the boom arm. The apparatus is then supported at the base so that by retracting the boom arm the excavator can continue to move. Thus, it is possible by means of this construction, to shape a suitably stable base structure and, in addition, to protect the cutter during this continued movement.

In the embodiment depicted, the slotted guide opening 11 extends across only a part of the breadth of the cutter plate as viewed at right angles to the lengthwise direction of the cutting edge. It is of course also possible for the entire cutting edge of the cutter plate 4 to engage between two guide plates.

It is advantageous for the cutter plate to be shaped approximately in the form of a sickle, as seen in top view, with steeply sloping outer borders 14 and 15 being provided facing away from the cutting edge 13. In this manner, in practical terms, the cutter will have a correspondingly large width over much of its length. The cutter is preferably of a rectilinear desing, i.e., the cutting edge is rectilinear, which, in particular, facilitates also the process of sharpening the blades.

The axis of rotation 10 is preferably provided with a central location approximately at the broadest part of the cutter member 4 so that deformation in this area will be prevented. The point of attachment for the cutter drive mechanism, which is shown in the drawings as comprising a hydraulic cylinder 16, is situated relative to the axis of rotation 10 of the cutter at the free end of an extension 17 formed on the cutter. The extension 17 faces away from the sector of the cutting edge. Moreover, this point of attachment of the cutter member 4 is extended outwardly a relatively substantial distance across the plane formed by the cutting edge 13 so that by this means favorable power conditions are enabled and, in addition, during pivoting of the cutter member the required space within the base structure 1 may be dimensioned to be relatively small.

The guide opening 11 extends over a freely projecting arm 18 of the base structure 1 with a freely projecting arm 19 being situated oppositely thereto. Within the arm 19 there is formed a broad notch 20 which is substantially broader than the guide means 11 so that the free end of the cutter member 4 can, in the cutting process, engage within the notch 20 even when the free end of the cutter deviates substantially from an ideal theoretical cutting plane.

Other alterations and modifications are of course possible within the framework of the invention. At the same time, however, the basic features of the invention will involve the provision of the slotted guide means for the cutter, the formation of the cutter as a planar or plate-like steel part and the provision of a section of the cutter which projects freely during the process.

Tests have shown that an apparatus in accordance with the present invention may be used even with hard woods without difficulty with the cutting edge showing substantially reduced wear. It is of course also possible by corresponding movement of the base structure 1 and consequently of the holding arms 5 and 6 to impart a prestress to a tree part to be held for a cutting operation so that the cutter member may achieve the cutting operation with greater ease.

While a specific embodiment of the invention has been shown and described in detail to illustrate the application of the inventive principles, it will be understood that the invention may be embodied otherwise without departing from such principles.

What is claimed is:

1. Apparatus for cutting tree parts adapted to be operatively mounted on vehicles comprising a base structure configured to define a concave cutting recess for receiving therein a tree part to be cut, at least one pivotable holding arm adapted to grip a tree part engaged within said cutting recess, a cutter plate having a generally planar configuration and defining a cutting edge adapted to be moved through said cutting recess to cut a tree part held therein, pivot means pivotally mounting said cutter plate on said base structure, means for driving said cutter plate through a cutting stroke between a retracted position and an extended position by pivotal motion thereof about said pivot means, and means located between said pivot means and said cutting recess defining a slotted guide opening adjacent said cutting recess through which said cutter plate moves during said cutting stroke, said cutter plate thereby projecting freely through said slotted guide opening into said cutting recess over a sector thereof adjacent said cutting edge as said cutting edge plasses through said cutting recess, said cutting edge of said cutter plate being held within said slotted guide opening essentially along the entire length thereof when said cutter plate is in said retracted position, said slotted guide opening extending essentially completely across the entire expanse of said cutter plate essentially throughout said cutter stroke to completely support said cutter plate throughout movement thereof between said retracted position and said expanded position.

2. Apparatus according to claim 1 wherein said slotted guide opening is defined by boundary surfaces which are arranged in a marginal region of a housing forming said base structure.

3. Apparatus according to claim 1 wherein said slotted guide opening is defined with a border which faces toward said cutting recess and which extends approximately flush with said cutting edge of said cutter plate when said cutter plate is in a retracted position.

4. Apparatus according to claim 1 wherein said slotted guide opening extends over only a part of the breadth of said cutter plate as viewed from a direction perpendicular to the lengthwise direction of said cutting edge.

5. Apparatus according to claim 1 wherein the entire length of said cutting edge of said cutter plate engages between two guide plates which comprise said means defining said slotted guide opening when said cutter plate is in said retracted position.

6. Apparatus according to claim 1 wherein said cutter plate is formed approximately in the form of a sickle with steeply sloping outer borders facing away from said cutting edge, said cutting edge being formed with a rectilinear configuration.

7. Apparatus according to claim 1 or 6 wherein said pivot means define an axis of rotation for said cutter member provided at a generally central location thereon approximately at the broadest part of said cutter member and wherein said driving means are attached to said cutter plate at an extension part thereof which, relative to said axis of rotation thereof, faces away from the portion of said cutter plate defining said cutting edge.

8. Apparatus according to claim 1 wherein said base structure is formed with a pair of projecting arms defining said cutting recess therebetween, with said slotted guide opening being defined along one of said freely projecting arms and with a notch being formed in the other of said freely projecting arms, with the side of said cutter member having said cutting edge thereon extending into said notch at the end of the cutting stroke, said notch providing a dimension which is wider than the dimension of said slotted guide opening for receiving therein the free end of said cutter member during the cutting stroke.

9. Apparatus for cutting tree parts adapted to be operatively mounted on vehicles comprising a base structure configured to define a concave cutting recess for receiving therein a tree part to be cut, at least one pivotable holding arm adapted to grip a tree part engaged within said cutting recess, a cutter plate having a generally planar configuration and defining a cutting edge adapted to be moved through said cutting recess to cut a tree part held therein, pivot means pivotally mounting said cutter plate on said base structure, means for driving said cutter plate through a cutting operation by pivotal motion thereof about said pivot means, and means located between said pivot means and said cutting recess defining a slotted guide opening adjacent said cutting recess through which said cutter plate moves during a cutting operation, said cutter plate thereby projecting freely through said slotted guide opening into said cutting recess over a sector thereof adjacent said cutting edge as said cutting edge passes through said cutting recess, said slotted guide opening extending over only a part of the breadth of said cutter plate as viewed from a direction perpendicular to the lengthwise direction of said cutting edge.

* * * * *